United States Patent [19]

Hayakawa

[11] Patent Number: 5,305,031
[45] Date of Patent: Apr. 19, 1994

[54] SEALED CASE

[75] Inventor: Masahiro Hayakawa, Tokyo, Japan

[73] Assignee: Asahi Kogaku Kogyo Kabushiki Kaisha, Tokyo, Japan

[21] Appl. No.: 955,262

[22] Filed: Oct. 1, 1992

[30] Foreign Application Priority Data

Oct. 3, 1991 [JP] Japan .................. 3-88873[U]

[51] Int. Cl.⁵ .............................................. G03B 17/08
[52] U.S. Cl. ...................................... 354/64; 206/811; 354/288
[58] Field of Search ................... 354/64, 288; 206/811

[56] References Cited

U.S. PATENT DOCUMENTS

| | | | |
|---|---|---|---|
| 3,759,605 | 9/1973 | Johnson | 354/64 |
| 4,771,299 | 9/1988 | Gell, Jr. | 354/64 |
| 4,771,320 | 9/1988 | Gell | 354/64 |
| 4,931,816 | 6/1990 | Kamo et al. | 354/64 |
| 4,980,707 | 12/1990 | Gell, Jr. | 354/64 |
| 5,070,348 | 12/1991 | Hayakawa et al. | 354/64 |
| 5,126,772 | 6/1992 | Albrecht | 354/64 |
| 5,159,366 | 10/1992 | Gell, Jr. | 354/64 |

Primary Examiner—Michael L. Gellner
Assistant Examiner—Jae N. Noh
Attorney, Agent, or Firm—Sughrue, Mion, Zinn, Macpeak & Seas

[57] ABSTRACT

A sealed case comprises a communication hole in an outer wall of the case for communicating the inside and outside of the case, and the communication hole is closed by a seal element comprising a highly restorable elastic element having airtightness.

10 Claims, 3 Drawing Sheets

SEALED CASE

BACKGROUND OF THE INVENTION

This application is based on and claims priority from Japanese Application No. HEI 3-88873 filed Oct. 3, 1991, the disclosure of which is incorporated herein by reference.

The invention relates to a sealed case which protects an inside of the case from the outside environment, such as a waterproof case of an apparatus which needs a waterproof and dampproof structure.

One example of a sealed case is an exterior case of a camera which has a waterproof and dampproof structure. Such a sealed case has to be inspected for airtightness. For example, it has been known to measure a pressure change on the inside of the case as a method of inspection. That is, a communication hole is provided in advance through an outer wall between the inside and the outside of the case, and a change in the pressure of the inside is measured by a barometer after taking air from or sending compressed air into the inside of the case. At this time, if the air leaks from unexpected holes or spaces so that the case is incompletely sealed, the pressure of the inside of the case gradually approaches the pressure of the atmosphere. Thus, the airtightness is inspected by detecting the presence or absence of the pressure change.

With respect to the conventional sealed cases, one type uses as the communication hole an opening provided for other purposes which is opened or closed by a kind of cap such as a dry cell cover, and another type uses a communication hole provided exclusively for the airtightness inspection, which is opened or closed by a cap.

However, the conventional sealed cases have the following problems. The cap opening or closing the hole for the inspection cannot be inspected itself for airtightness. Also, the cap has to be taken off and put on before and after the inspection. Still further, connection means for connecting the hole and a tube are needed to take out or send the air, and the connection means must avoid leaking air from a connecting portion.

SUMMARY OF THE INVENTION

The invention was made based upon the above-described problems, and it is an object of the invention to supply a sealed case in which the cap of an opening provided for other purposes can be inspected for airtightness, in which it is unnecessary to put on and take off the cap before and after the inspection, and in which it is possible to airtightly connect the communication hole and the tube used to take air out of the case and to send air into the case.

In order to accomplish the above object, the sealed case of the invention which covers the inside of a case from the outside environment includes a communication hole provided on an outer wall of the case for communicating between the inside and outside of the case, with the communication hole being closed by a seal member including a highly-restorable elastic member which is airtight.

BRIEF DESCRIPTION OF THE DRAWINGS

The invention will be more clearly understood from the following description in conjunction with the accompanying drawings, wherein.

DETAILED DESCRIPTION OF THE PREFERRED EMBODIMENTS

The preferred embodiments of the invention will now be described with reference to the accompanying drawings which show the invention applied to the exterior case of a compact camera as the sealed case.

Figure 1:
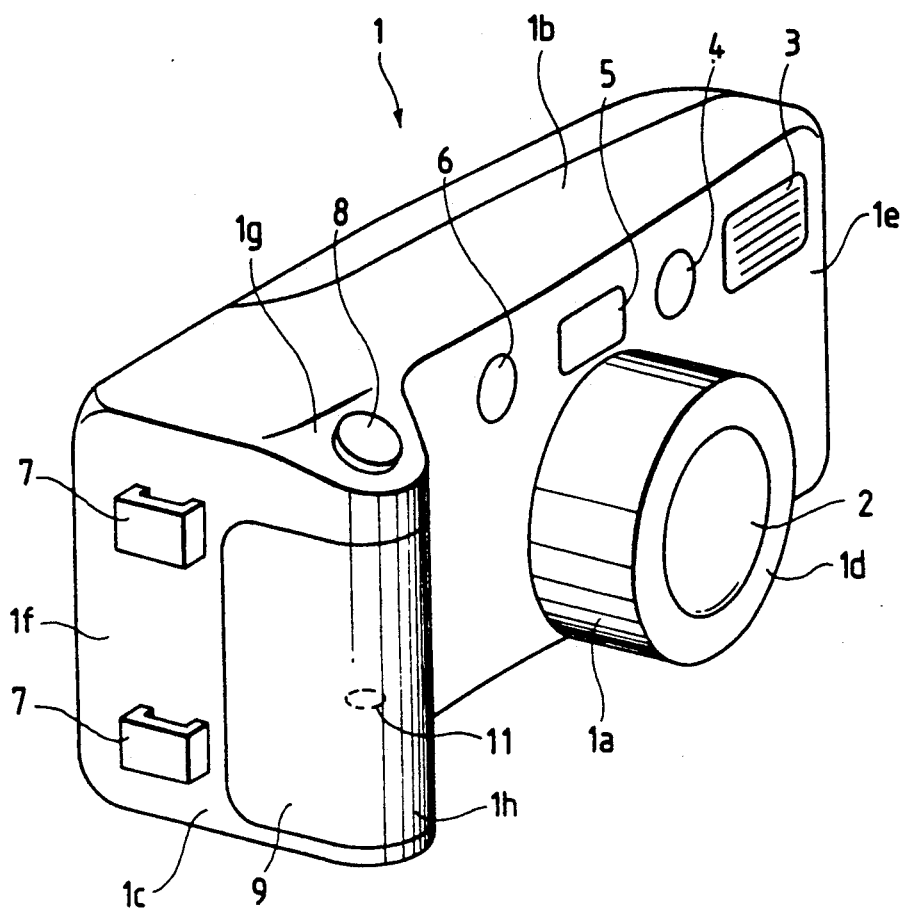
FIG. 1 is a perspective view of a camera employing an embodiment of the invention.

FIG. 1 is a perspective view showing the exterior case of a compact camera employing a first embodiment of the invention. The exterior case 1 is composed of a lens-barrel portion 1a, a body 1b and a grip portion 1c. A cover glass 2 of an imaging lens (not shown)is provided watertightly on a center of front portion 1d of upper portion of a front surface 1e of the body 1d, a window 3 for projecting a flash, a window 4 to project a light for an auto focus, a window 5 for a finder and window 6 to accept a light for the auto focus are provided in a straight line and all are watertight. Two passing holes 7 for a strap are provided on the left side 1f of the body 1d. A release button 8 is provided in a watertight manner in an upper portion 1g of the grip portion 1c. A rubber member 9 is glued or otherwise bonded to a front surface 1h of the grip portion 1c, to prevent slipping when holding the grip. A circular communication hole for communicating with an inside space of the exterior case 1 is bored in the front surface 1h of the grip portion 1c, inside of the rubber member 9.

Figure 2:
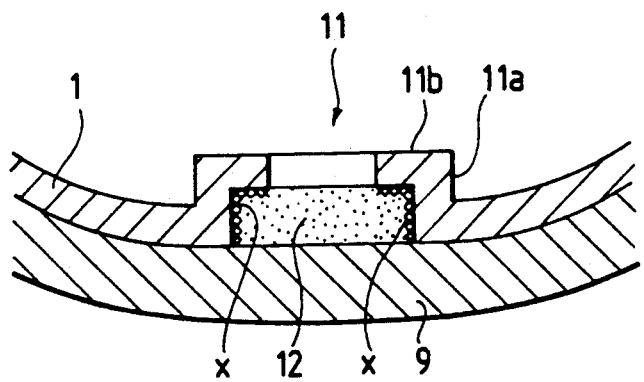
FIG. 2 is a partial cross-sectional view of a communication hole for inspecting the airtightness of the exterior case of the camera shown in FIG. 1.

FIG. 2 is a partial cross-sectional view of the grip portion 1c around the communication hole 11. As shown in FIG. 2, the communication hole 11 is composed of a cylinder portion 11a projecting toward the inside of the case 1, and a donut-shaped flange portion 11b provided on an end of the inside of the cylinder portion 11a. An elastic member, such as a disk-like seal member 12 made from rubber, that is highly-restorable and is non-porous and impermeable, is bonded and fixed in the space surrounded by the cylinder portion 11a, the flange portion 11b and the rubber member 9 on the outer surface of the exterior case 1. As shown in the figure, X indicates a bonded surface.

Figure 7:
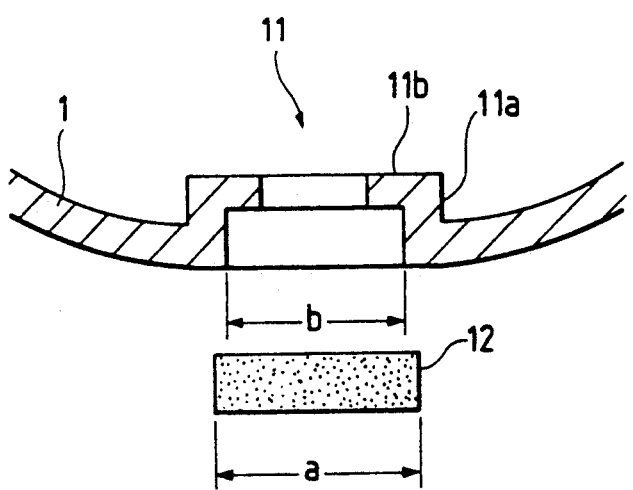
FIG. 7 is an explanatory view of decomposed communication hole and seal member.

In this embodiment, for the highly restorable elastic member which is non-porous and impermeable, chloroprene rubber, nitrile rubber or mixture of a nitrile rubber and vinyl chloride or the like may be used. The structure of these rubbers do not impede an airtightness. Accordingly, air and water cannot permeate through the seal member 12 made from such a rubber under normal conditions. The seal member 12 can be penetrated by sticking a needle or the like into the seal member against its elasticity. At this time, a contact surface between the needle and the seal member 12 is kept sealed by the elasticity of the seal member. In addition, even if a through-hole is formed as described above, the through-hole is closed naturally according to the strong elasticity of the member 12 after pulling out the needle. Therefore, air and water do not leak from the mark of the through-hole. Especially, in this embodiment, the through-hole is compressed around its circumference and closed strongly after pulling out the needle, because an outer diameter "a" of the seal member is larger than an inner diameter "b" of the communication hole 11, so that the seal member 12 must be compressed into the communication hole 11, as shown in FIG. 7. In addition, the higher thickness of the seal member enhances the airtightness, and the seal member is made thicker than the exterior case in the embodiment.

Inspection of the airtightness of the sealed case having the above-described composition will now be described.

Figure 3:
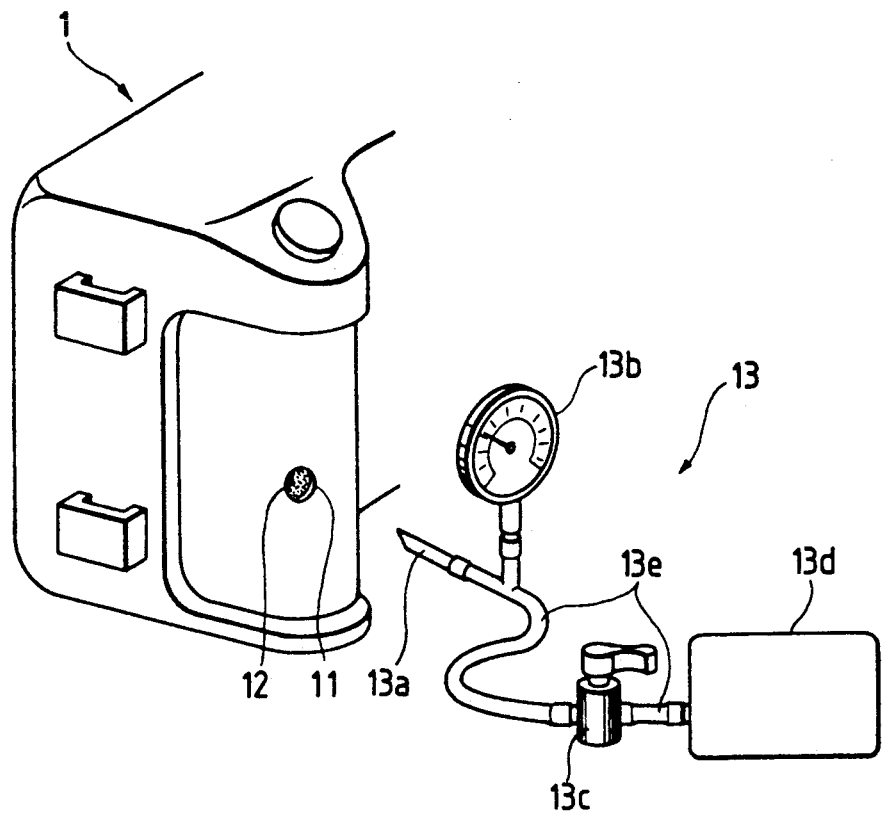
FIG. 3 and FIG. 4 are explanatory views of the airtightness inspection of the exterior camera case in the embodiment.
Figure 4:
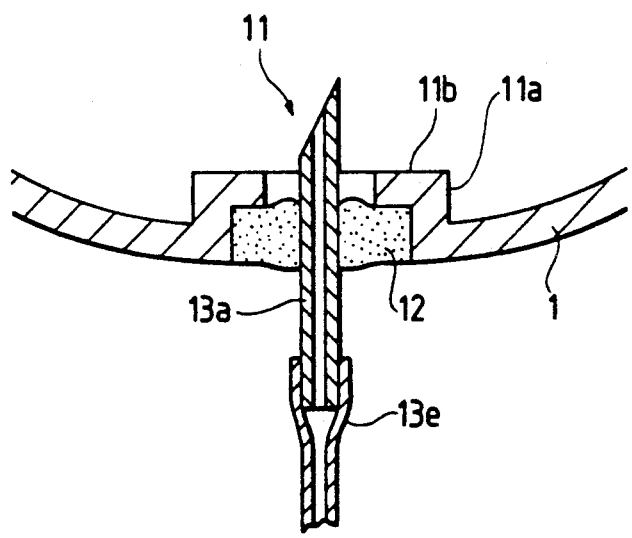

The airtightness inspection is performed before gluing the rubber member 9 on the grip 1c of the exterior case 1, as shown in FIG. 3. An airtightness inspection apparatus 13 is composed of an injection needle 13a, a barometer 13b connected to the injection needle 13a through a tube 13e, and a compressed air bottle 13d connected to the injection needle 13a through a cock 13c and the tube 13e.

On the airtightness inspection, the injection needle 13a is first stuck into and passed through the seal member 12. Next, the cock 13c is opened and compressed air from the bottle 13d is sent into the inside of the exterior case 1 to raise the air pressure within the exterior case to higher than atmospheric pressure. Then, the presence or absence of air pressure decrease, that is, the presence or absence of an air leak, is detected by shutting the cock 13 and observing the barometer 13b. The air cannot pass through the seal member 12 because of its own airtightness. Also, the air cannot leak from between the seal member 12 and the injection needle 13a because the contact surface between these two members is sealed by the elasticity of the seal member. On the other hand, the seal member 12 must be bonded stickily to the inner surface of the communication hole, and it is possible to detect an inferiority of the airtightness, such as a leak from a crack in the casing due to inferior work and so on, because the air pressure decreases over time. In the case of the existence of a crack on a connecting portion between the exterior case 1 and the cover glass 2, or a leak through an opening provided for a purpose other than airtightness inspection, it is also possible to detect the inferiority of the airtightness according to the air pressure falling.

If the air pressure does not fall after a predetermined time has elapsed, the airtightness can be concluded to be fine, and the inspection is finished and injection needle is pulled out. At this time, the through-hole opened by the needle is closed naturally after pulling out the needle because, as described above, the rubber used as the seal member 12 has a high restorability based upon its own high elasticity and due to the fact that it is put into the communication hole 11 in a compressed state. Therefore, the air does not leak from the communication hole even though the hole is not closed with a cap thereafter.

After the above-described operation is finished, the communication hole 11 is hidden by gluing the rubber member 9 onto the grip portion 1c.

In addition, an alternate technique for airtightness inspection is to detect the presence or absence of a rise in the air pressure after lowering the inside pressure by evacuating the inside of the case.

Figure 5:
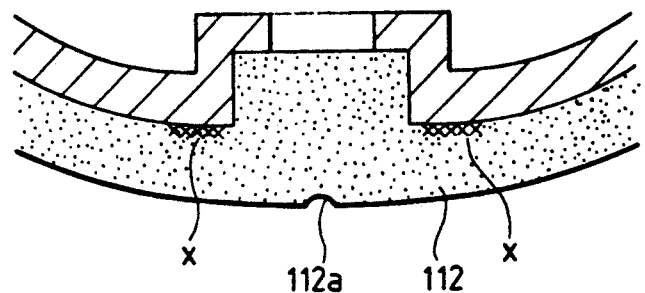
FIG. 5 is a partial cross-sectional view of a communication hole according to a second embodiment.

In the above-described embodiment, the seal member 12 and the rubber member 9 are separate members from each other. However, as shown in FIG. 5, the rubber member 9 may be substituted with one formed integrally with the seal member 112, and can be used to prevent slipping. In this case, the airtightness of the through-hole after removal of the needle becomes better because the thickness of the seal member 112 can be greater. In addition, a mark 112a which indicates the place of the communication hole 11 may be formed on a surface of the seal member 112.

Figure 6:
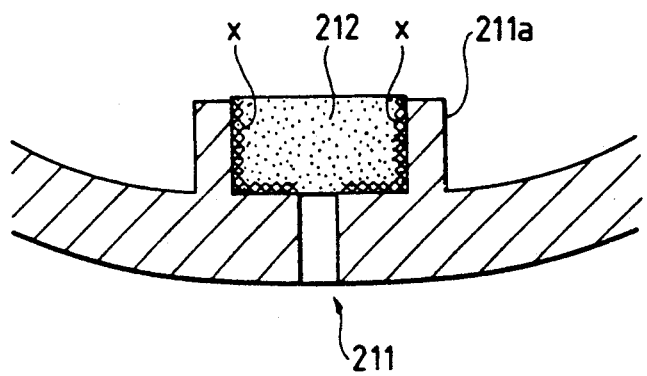
FIG. 6 is a partial cross-sectional view of a communication hole according to a third embodiment.

The rubber member 9 may be omitted if desired. In this case, as shown in FIG. 6, the seal member 212 is put compressedly into and bonded on the projected cylinder portion 211a from the inside of the exterior case 1, and if the outside diameter of the communication hole 211 is kept small, the seal member will not be pushed off during insertion of the needle.

In the above-described embodiments, the sealed case to which the invention is applied is the exterior case of a camera. However, the invention is not limited to a camera case, but may be applied to all sealed cases such as the exterior case of a remote control unit of a camera, a waterproof trunk and so on.

What is claimed is:

1. A sealed case having an outer wall for protecting an inside of the case from an outside environment, said outer wall including a communication hole for communicating the inside and outside of said case, and a self-sealing seal member closing said communication hole, said seal member being formed of a highly-restorable elastic member which is substantially impermeable to air, wherein, upon penetration of said seal member by a penetration member to form a penetration hole in said seal member and subsequent withdrawal of said penetration member, said seal member self-seals, thereby closing said penetration hole and retaining its substantial impermeability to air.

2. The sealed case according to claim 1, wherein the diameter of said seal member is greater than that of said communication hole, whereby said seal member is put in a compressed state when disposed in said communication hole.

3. The sealed case according to claim 1, wherein said sealed case comprises an exterior case of a camera.

4. The sealed case according to claim 2, wherein said sealed case comprises an exterior case of a camera.

5. The sealed case according to claim 1, wherein said seal member is on a side of said communication hole inside of said case.

6. The sealed case according to claim 1, wherein said seal member is on a side of said communication hole outside of said case.

7. The sealed case according to claim 1, wherein said case includes a cylindrical portion projecting toward the inside of said case, with said seal member disposed in said cylindrical portion.

8. The sealed case according to claim 5, wherein said case includes a cylindrical portion projecting toward the inside of said case, with said seal member disposed in said cylindrical portion.

9. The sealed case according to claim 6, wherein said case includes a cylindrical portion projecting toward the inside of said case, with said seal member disposed in said cylindrical portion.

10. The sealed case according to claim 1, wherein a rubber member overlies at least a portion of the outside of said case and said seal member is integrally formed with said rubber member.

* * * * *